United States Patent
Sohda (10) Patent No.: US 7,318,166 B2
(45) Date of Patent: Jan. 8, 2008

(54) SYNCHRONIZATION METHOD, COMPUTER SYSTEM AND PROGRAM WHEREIN THE SYNCHRONIZATION IS PROVIDED AS A USER PROCESS OF AN OPERATING SYSTEM OF THE COMPUTER

(75) Inventor: Takeshi Sohda, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 417 days.

(21) Appl. No.: 10/996,320

(22) Filed: Nov. 22, 2004

(65) Prior Publication Data

US 2005/0120258 A1    Jun. 2, 2005

(30) Foreign Application Priority Data

Nov. 28, 2003 (JP) .............................. 2003-398555

(51) Int. Cl.
G06F 1/12 (2006.01)
G06F 1/00 (2006.01)
H04J 3/06 (2006.01)

(52) U.S. Cl. ...................... 713/400; 713/500; 370/503

(58) Field of Classification Search ............... 713/400, 713/500; 368/46; 370/503, 508, 509, 510
See application file for complete search history.

(56) References Cited

U.S. PATENT DOCUMENTS 5,040,158 A * 8/1991 Lee et al. ..................... 368/10
5,918,041 A * 6/1999 Berstis ......................... 713/503
7,176,978 B2 * 2/2007 Uchida et al. .............. 348/515
2003/0219039 A1* 11/2003 Oguchi ........................ 370/503

FOREIGN PATENT DOCUMENTS

JP    06148357 A  *  5/1994

* cited by examiner

Primary Examiner—Suresh K Suryawanshi
(74) Attorney, Agent, or Firm—Mark S. Walker; Suiter Swantz pc llo

(57) ABSTRACT

The present invention is a computer system for performing processing synchronously with an internal system clock. The system includes a time information inputting part for detecting a signal for time notice sent from an external reference clock and acquiring an internal time at the present time from the system clock. The system further includes a time correction controlling part for comparing the time information together with the signal for time notice and the internal time at the time of detecting the signal for time notice and correcting the time of the system clock based on the comparison result. Further, the time correction controlling part calculates a signal interval that is a time difference in said system clock between two consecutive signals for time notice based on the internal time acquired from the time information inputting part, evaluating the calculated signal interval and judging whether or not it is required to correct the internal time.

8 Claims, 6 Drawing Sheets

SYNCHRONIZATION METHOD, COMPUTER SYSTEM AND PROGRAM WHEREIN THE SYNCHRONIZATION IS PROVIDED AS A USER PROCESS OF AN OPERATING SYSTEM OF THE COMPUTER

FIELD OF THE INVENTION

The present invention relates to a synchronization scheme and method for synchronizing an internal clock of a system using a computer with a reference clock.

BACKGROUND ART

Figure 6:
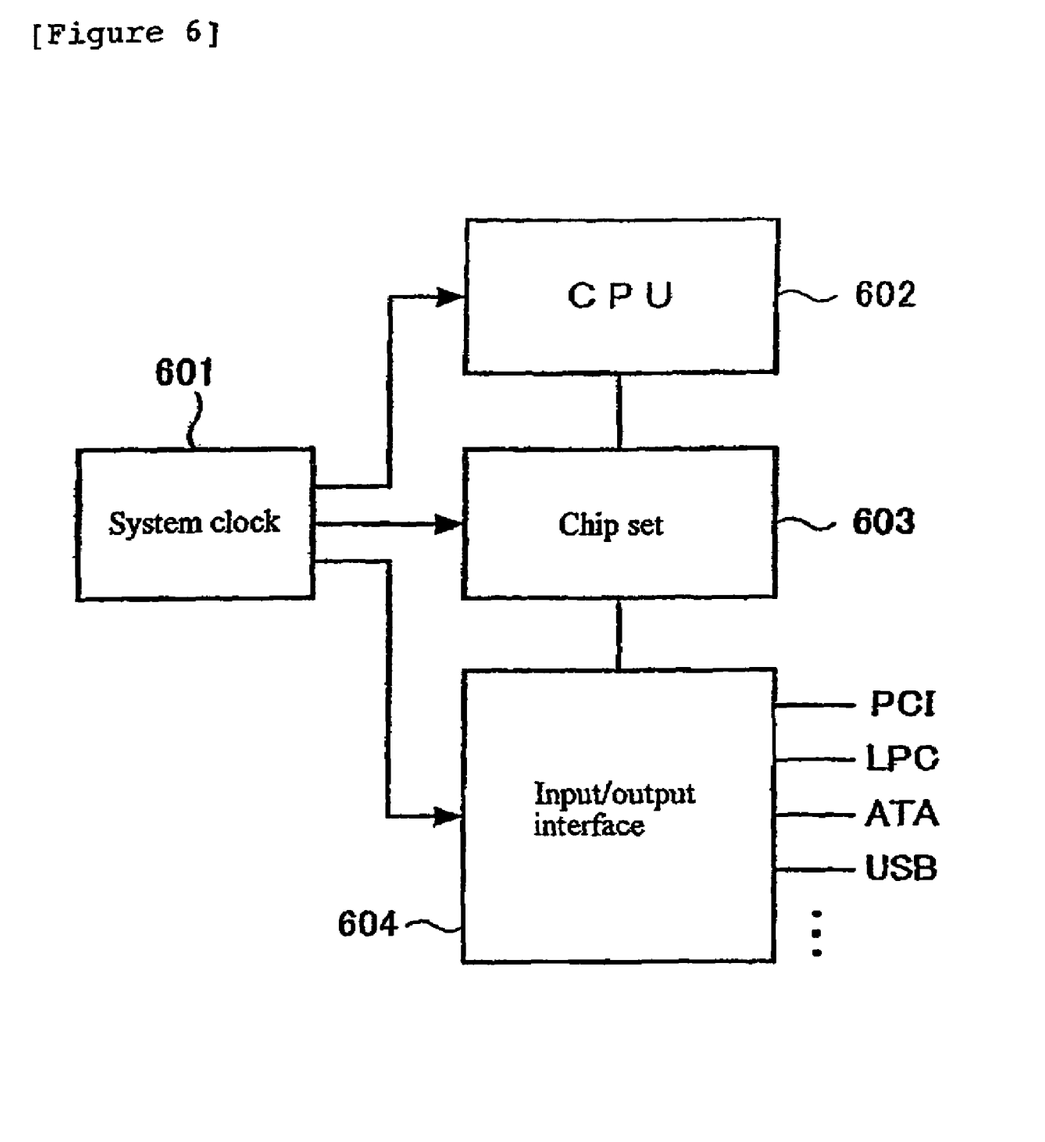
FIG. 6 is a block diagram showing a configuration example of the computer operating in synchronism with the system clock.

The computer operates a CPU 602, a chip set 603 and an input/output interface 604 in synchronism with a system clock pulse generated by a system clock (clock generator) 601 inside the system, as shown in FIG. 6. Thus, in the system in which a plurality of computers or other apparatuses cooperate to perform the processings, it is required that the system clock is synchronized with the reference clock (specific external clock or system clock of a specific apparatus).

The accuracy for synchronization of the system clock among a plurality of apparatuses, which may be appropriately decided according to the system configuration or the uses, is required in a unit of 1 millisecond for a contents distribution system for digital broadcasting, for example. Nowadays, in the computer of workstation class, the system clock may supposedly contain an error of several tens microseconds, whereby it is required to correct the system clock at every interval of several seconds to several tens seconds to keep the accuracy in a unit of 1 millisecond.

Various techniques for synchronizing the time among a plurality of apparatuses have been conventionally offered.

Those conventional synchronization methods involve synchronizing the time by comparing the time of the system clock for each apparatus, in which the synchronization accuracy is improved by performing a statistical processing to resolve a delay till each apparatus replies the time in response to a time inquiring request or a delay caused through the communication between apparatuses.

As described above, for synchronization of the time among the plurality of apparatuses, though the required accuracy of synchronization may be decided according to the system configuration or the uses, it is important that the signal for time notice from a clock to be referenced (herein after a reference clock) is detected without delay to achieve synchronization at high accuracy, and the time of the system clock (herein after an internal clock) of comparison object is acquired without delay.

As means for acquiring those information without delay, a device driver of a TTY (teletype) device for acquiring those information may be remolded, or a function of creating a system call replacing the TTY device driver may be provided for the system. However, in the case of using a different hardware or making the version-up of the system, there is a problem that a lot of maintenance cost is needed.

Thus, if synchronization means between the reference clock and the system clock is implemented as a user process of the OS (Operating System), the maintenance is facilitated and the universality is enhanced.

However, since various processes are usually operating in the computer at any time, there is a fear that there occurs a delay in a process for detecting the signal for time notice from the reference clock or the subsequent process due to influence from a daemon process or interrupt handlers of other devices, if the synchronization means is implemented as the user process.

Also, with the conventional time synchronization method, it is taken into consideration to deal with a response to the time inquiring request or a delay in the communication between apparatuses, but it is not devised to detect the signal for time notice or acquire the internal time without delay.

Thus, it is an object of the invention to implement the synchronization at high accuracy by detecting the signal for time notice from an external reference clock without delay, and acquiring the time of a system clock of comparison object at the present time without delay.

Also, it is another object of the invention to implement a scheme of synchronization in which the maintenance is easy and the universality is high by acquiring those information as a user process for the OS.

SUMMARY OF THE INVENTION

In order to accomplish the above object, this invention is implemented as a synchronization method for synchronizing an internal time of a system using a computer with an external reference clock as constituted in the following. This synchronization method comprises a step of detecting a signal for time notice sent from the reference clock and acquiring the internal time at the present time from a system clock inside the system by the computer, a step of calculating a signal interval (a time difference in the system clock between the two consecutive signals for time notice) based on the acquired internal time by the computer, a step of evaluating the calculated signal interval and judging whether or not to correct the internal time by the computer, and a step of correcting the time of the system clock when it is judged that the computer is required to correct the internal time.

More particularly, the step of judging whether or not to correct the internal time is based on whether the calculated signal interval falls within a certain confidence interval obtained by a statistical processing of sampling from the past signal intervals.

More preferably, the synchronization method comprises a step of making the statistical processing using the signal interval calculated at the step of calculating the signal interval by the computer, and replacing the parameters for evaluation at the step of judging whether or not to correct the internal time.

Also, the synchronization method comprises a step of comparing the time information sent together with the signal for time notice from the reference clock and the internal time at the time of detecting the signal for time notice, and calculating a time difference between the time information and the internal time, wherein the step of correcting the time of the system clock comprises correcting for the calculated time difference.

Also, another synchronization method according to the invention comprises a step of detecting a signal for time notice sent from the reference clock and acquiring the internal time at the present time from a system clock inside the system by the computer, a step of calculating a signal interval that is a time difference in the system clock between the two consecutive signals for time notice based on the acquired internal time by the computer, a step of evaluating the calculated signal interval and judging whether or not the signal interval contains a delay due to influence of a processing performed by the computer, a step of comparing the time information sent together with the signal for time notice from the reference clock and the internal time at the time of detecting the signal for time notice, and judging whether or not it is required to correct the internal time based on the comparison result by the computer, and a step of correcting the time of the system clock when it is judged that the signal interval does not contain a delay and the computer is required to correct the internal time.

More particularly, it is judged that the signal interval does not contain the delay due to influence of the processing performed by the computer when the calculated signal interval falls within a certain confidence interval obtained by a statistical processing of sampling from the past signal intervals.

Also, in order to accomplish the above object, another invention is implemented as a computer system for performing the processing synchronously with an internal system clock as constituted in the following. This computer system comprises a time information inputting part for detecting a signal for time notice sent from an external reference clock and acquiring an internal time at the present time from the system clock inside the computer system, and a time correction controlling part for comparing the time information sent together with the signal for time notice from the reference clock and the internal time at the time of detecting the signal for time notice and correcting the time of the system clock based on the comparison result. And the time correction controlling part calculates a signal interval based on the internal time acquired from the time information inputting part, evaluating the calculated signal interval and judging whether or not it is required to correct the internal time.

More preferably, the computer system further comprises a statistical processing part for calculating the parameters for evaluating the signal interval by performing a statistical processing of sampling from the signal intervals calculated in the past by the time correction controlling part, wherein the time correction controlling part judges whether or not the signal interval contains a delay due to influence of the processing performed by the computer, using the parameters calculated by the statistical processing part.

Also, this invention is implemented as a program for controlling a computer to perform a processing corresponding to each step of the synchronization method, or a program for causing a computer to implement each function of the system. This program may be stored and delivered in a magnetic disk, an optical disk, a semiconductor memory or any other recording medium, or distributed via a network. With this invention as constituted in the above way, it is judged whether or not the time notice from the external reference clock is detected without delay, and the time (internal time) of the system clock of comparison object at that time is acquired without delay by evaluating the signal interval of the signal for time notice from the reference clock, whereby it is determined whether or not it is required to correct the time of the system clock. Therefore, the synchronization at high accuracy is implemented by performing the time correction by choosing the timing when there is no delay.

Also, this invention implements a synchronization scheme in which the maintenance is easy and the universality is high by providing the judgment whether there is any delay in detecting the time notice or acquiring the internal time and the time correction as a user process for the OS.

DETAILED DESCRIPTION

The best mode (embodiment) for carrying out the present invention will be described below in detail with reference to the accompanying drawings.

First of all, the invention will be outlined. In the invention, a system using a computer inputs a signal from an external reference clock, and synchronizes a system clock with the reference clock based on this input signal. The accuracy of synchronization is within 1 millisecond of error with reference to the reference clock. And for this synchronization, a process for comparing the reference clock and the system clock is implemented as a user process of the OS. In this case, since there is the possibility that a delay occurs in a process for detecting the input signal from the reference clock or the subsequent processing due to daemon processes or interrupt processes, the high accuracy is not assured if the time of the reference clock and the time of the system clock are directly compared and synchronized. Thus, in this invention, a signal interval of the input signal from the reference clock (a time difference in the system clock between two consecutive signals among the input signals from the reference clock) is measured, and the measured values are statistically processed to detect an error of the system clock and correct the system clock, as needed.

Figure 1:
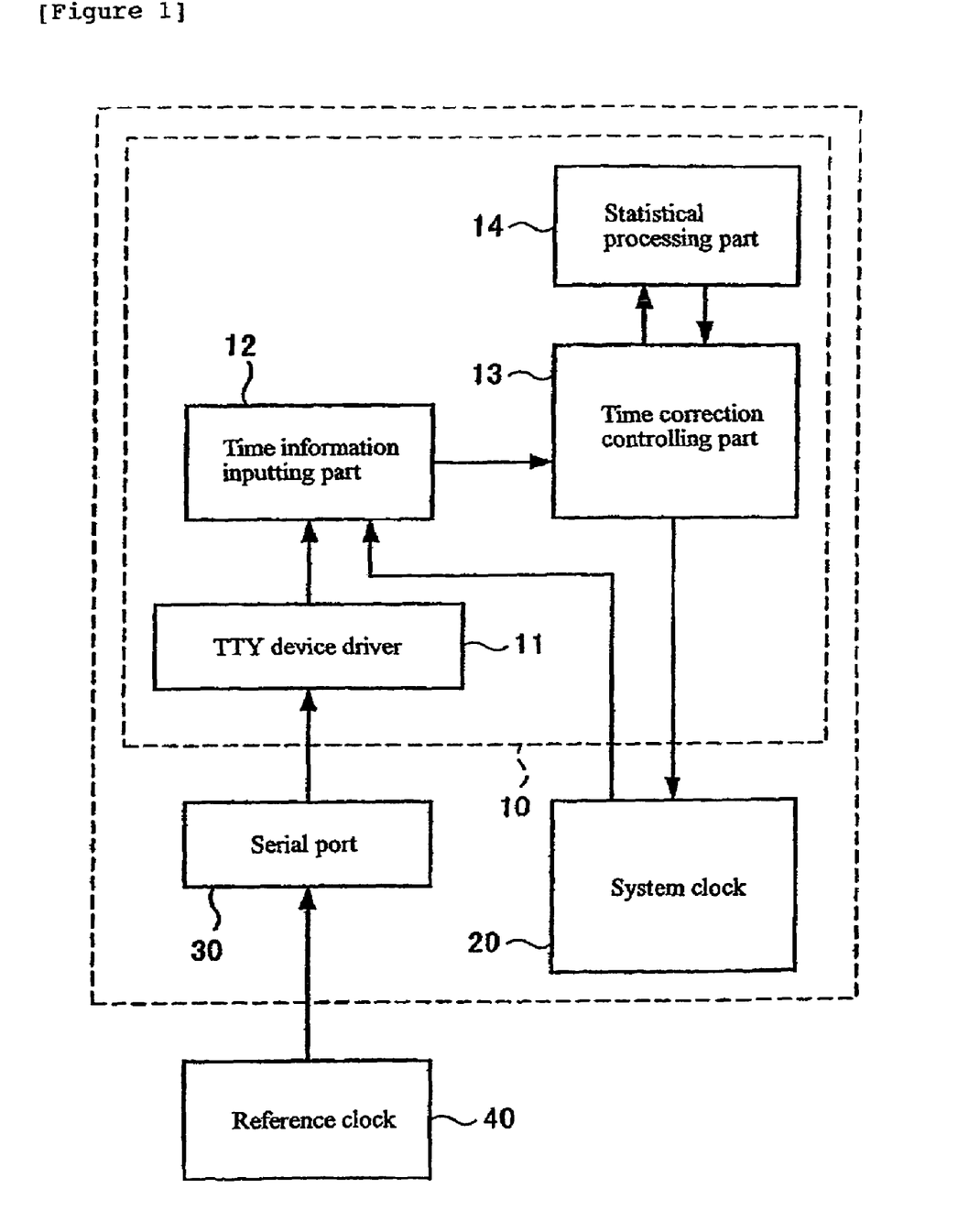
FIG. 1 is a block diagram showing the functional configuration of a computer for implementing a synchronization method of a system clock according to an embodiment of the present invention.

FIG. 1 is a block diagram showing the functional configuration of a computer for implementing a synchronization method of the system clock according to an embodiment of the present invention.

The computer of the embodiment as shown in FIG. 1 comprises a CPU (Central Processing Unit) 10 for implementing the following functions of the embodiment under the program control, a system clock 20, and a serial port 30 for connecting to an external reference clock 40. In FIG. 1, a configuration required to implement the synchronization method according to the embodiment is shown. The actual system mounts a chip set operating in synchronism with a system clock pulse generated by the system clock 20, an input/output interface and various kinds of devices connected to the interface.

Figure 2:
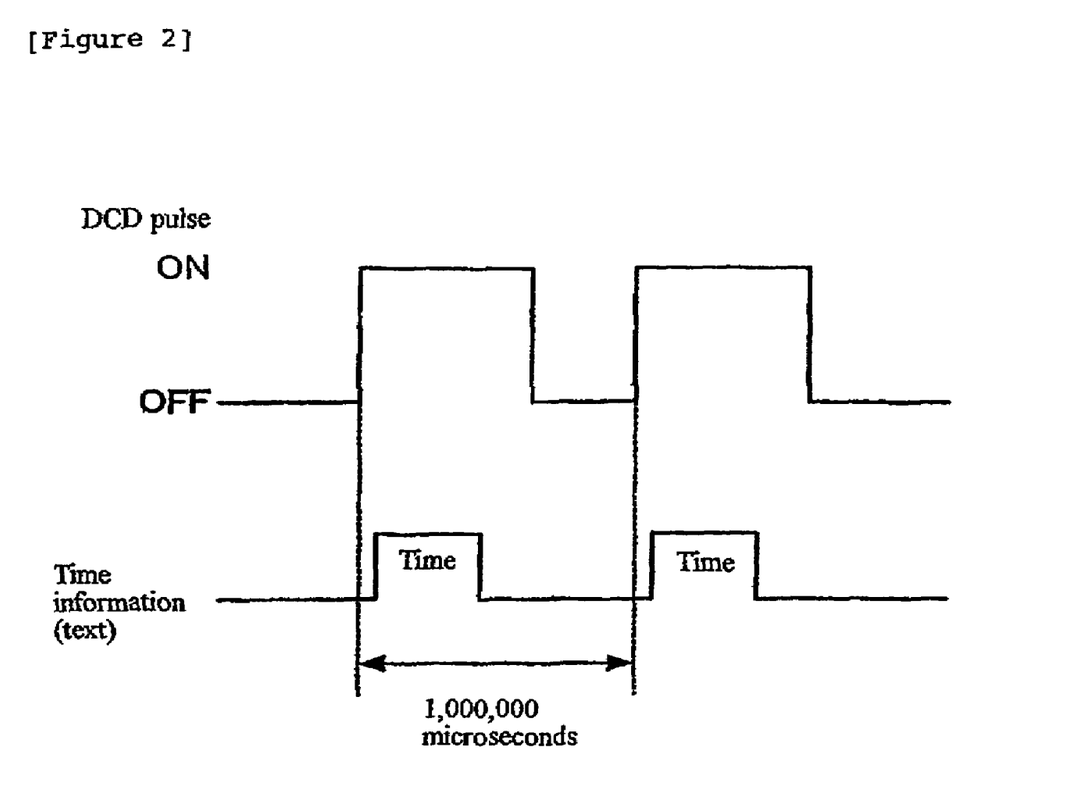
FIG. 2 is a chart showing the configuration of an output signal from a reference clock according to the embodiment.

In this embodiment, a signal of the external reference clock 40 is input via an RS-232C (Recommended Standard 232-C) serial interface. More specifically, the reference clock 40 notifies the timing every exact second with a DCD (Data Carrier Detect) pulse of the RS-232C, and immediately sends the time data (text data), as shown in FIG. 2. The computer receives the time notice with the DCD pulse and the time data via the serial port 30, and corrects the time of the system clock 20, as needed. These specifications are only illustrative, but the time notice and the time data may be sent using a signal line of the RS-232C other than the DCD pulse or an interface other than the RS-232C.

Referring to FIG. 1, in this embodiment, the functions of a TTY device driver 11, a time information inputting part 12, a time correction controlling part 13 and a statistical processing part 14 are implemented by the CPU 10 under the program control. A program for controlling the CPU 10 is provided by being stored and delivered in a magnetic disk, an optical disk, a semiconductor memory or any other recording medium, or distributed via the network, and read into a memory, not shown, of the computer as shown in FIG. 1 to control the operation of the CPU 10.

The TTY device driver 11 is provided as a function of the OS to receive the time notice of a DCD pulse and the time data input via a serial port 30, and pass it to the time information inputting part 12.

The time information inputting part 12 is provided as a user process to receive the time notice of DCD pulse and the time data from the TTY device driver 11, and acquire an internal time from the system clock 20 at the time of receiving the DCD pulse.

The time correction controlling part 13 is provided as a user process to judge an error of the system clock 20 from the reference clock 40 based on the time information acquired in the time information inputting part 12, and correct the time of the system clock 20 based on the judgment result, as needed. The details of a method for judging the error of the system clock 20 will be described later.

The statistical processing part 14 is provided as a user process to perform a statistical processing required for judging the error of the system clock 20 by the time correction controlling part 13.

A cause of a delay occurring when the function of the embodiment is performed as a user process, and whether or not the delay can be removed, will be described below. The user process for implementing the function of the embodiment will be herein after referred to as a time synchronization process.

Since various processes including interrupt handlers are operating on the computer at any time, if the function of the embodiment is performed as the user process, there is the possibility that a delay may be caused through the following three operations, (1) Detecting the signal for time notice with the DCD pulse, (2) Acquiring the internal time of the system clock, and (3) Correcting the system clock.

The causes of this delay may include the followings.

Paging of memory

Latency in a system call of detecting the DCD pulse

Priority of processes

Interruptions from other devices

The paging of memory has some influence on all the operations of (1) to (3), and causes a delay. For example, when a DCD pulse on interrupt indicating the detection of a DCD pulse occurs during a paging process, a DCD pulse on interrupt process is kept waiting, till the paging process during execution completes, thereby causing a delay. Also, if the time synchronization process is paged out when the DCD pulse on interrupt occurs, the time till the time synchronization process is paged in is the delay. These delays cannot be avoided if implemented as a user process.

The delay in the system call of detecting the DCD pulse occurs in the operation of (1). This delay is caused by the operation of a device driver based on the system call, and cannot be avoided in the user process. However, if the delay is actually measured using a trace function of the OS, the delay in the system call may be included in a range from 100 to 200 microseconds (μsec) in a computer having enough performance. Accordingly, when this computer is employed in this embodiment, there is no fault in suppressing the error from the time of the reference clock within 1 millisecond.

The priority of the process has some influence on all the operations (1) to (3), and causes a delay. When a plurality of processes are performed, a switching between processes (context switch) is made to perform the process with priority, in which the states of temporarily suspended processes are saved. The delay is caused through the processing of this context switch. However, if the priority of the process for implementing the functions of this embodiment is set at high level, it is possible to avoid the occurrence of the delay based on the priority of this process.

The interrupt of other devices has some influence on the operations (2) and (3), and causes a delay. When an interrupt request from the device is made to the CPU 10, the CPU 10 interrupts the process during execution, and performs an interrupt handling for the interruption. Among the above three operations, the operation of (1) detecting the time notice with DCD pulse is performed by the interrupt handler in response to an RS-232C interrupt request, but two operations of (2) acquiring the internal time of the system clock and (3) correcting the system clock are performed upon the system call from the user process, whereby a delay may be caused by the interrupt handling that is activated in response to an interrupt request from other device after the operation of (1). And this delay cannot be avoided in the user process.

By the way, it is considered that the time of the system clock 20 is corrected for synchronization with the reference clock 40. In this case, it is required to make the time correction when there is no delay in the above operations (1) to (3). Among the causes for the delay, the delay due to the paging of memory and the delay due to interruption of other device cannot be removed, but the delay caused by them does not always occur. Accordingly, if the delay can be detected, the time of the system clock 20 is corrected when there is no delay.

However, it is impossible for the user process to detect directly the occurrence of the delay in receiving individual DCD pulses. Thus, in this embodiment, a time difference in the detected time of the system clock 20 between two consecutive DCD pulses, namely, the interval between DCD pulses measured by the system clock 20 is processed to detect the delay.

A delay detection method according to this embodiment will be described below in detail.

Figure 3:
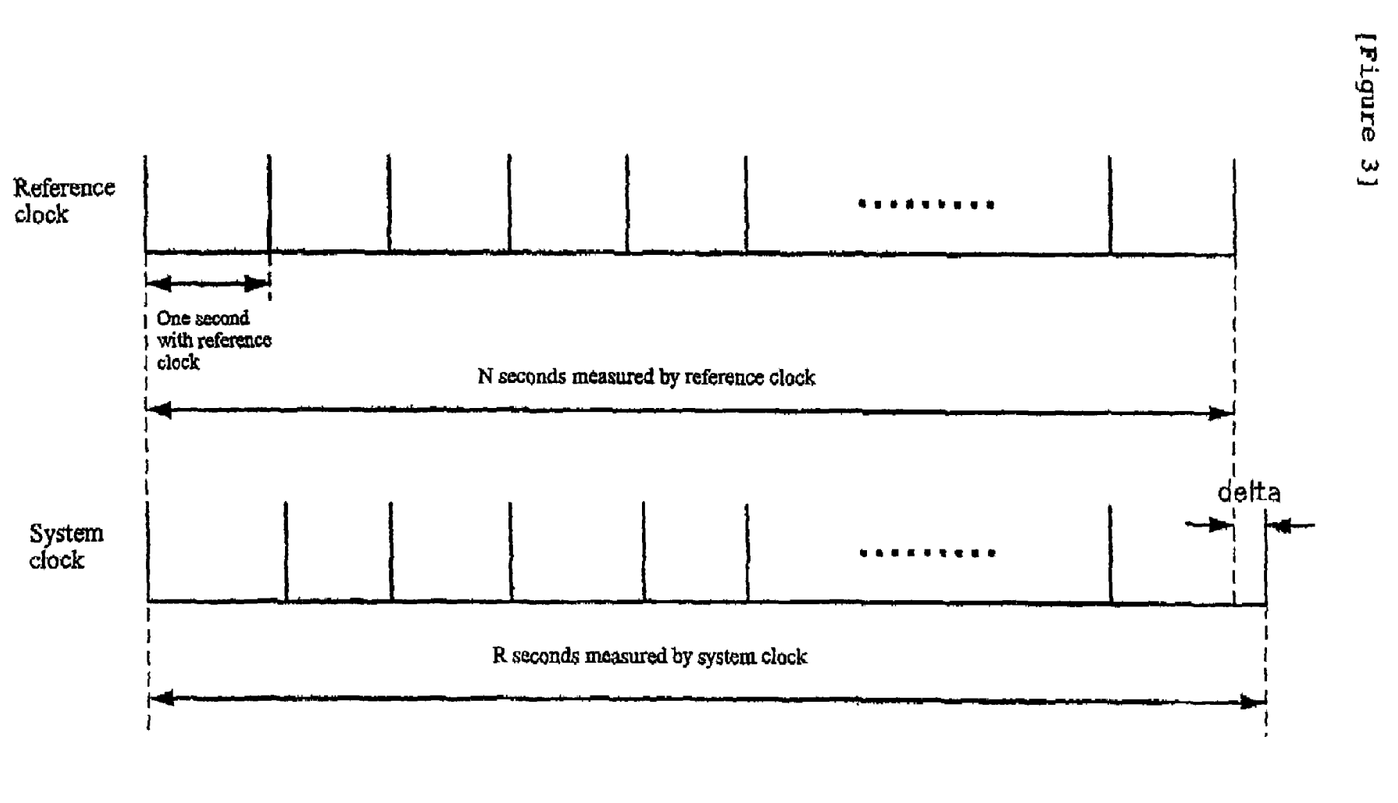
FIG. 3 is a chart showing the relationship between the pulse originating timing of the reference clock and the clocking of the system clock.

FIG. 3 is a chart showing the relationship between the pulse originating timing of the reference clock 40 and the clocking of the system clock 20.

As shown in FIG. 3, the reference clock 40 sends the time notice pulse (DCD pulse) at every timing of every exact second, whereby N pulses are sent during N seconds. Suppose that the total time required for the time information inputting part 12 of the computer to receive the N pulses, which is measured in the system clock 20, is R seconds. Each pulse interval measured by the system clock 20 is not necessarily equal to 1 second under the influence of other processes or the interrupt handlers. That is, the interval between pulses originated every second essentially may be longer than 1 second in the detected time of the system clock 20. However, since this delay does not occur frequently, when the system clock 20 itself keeps good time, and no pulses disappear, the error delta (=|R-N|) under these influences can be ignored, if N is sufficiently large. Accordingly, the average value of pulse interval R/N measured by the system clock 20 is $$R/N = 1,000,000 \ [\mu sec]$$

or 1 second.

Figure 4:
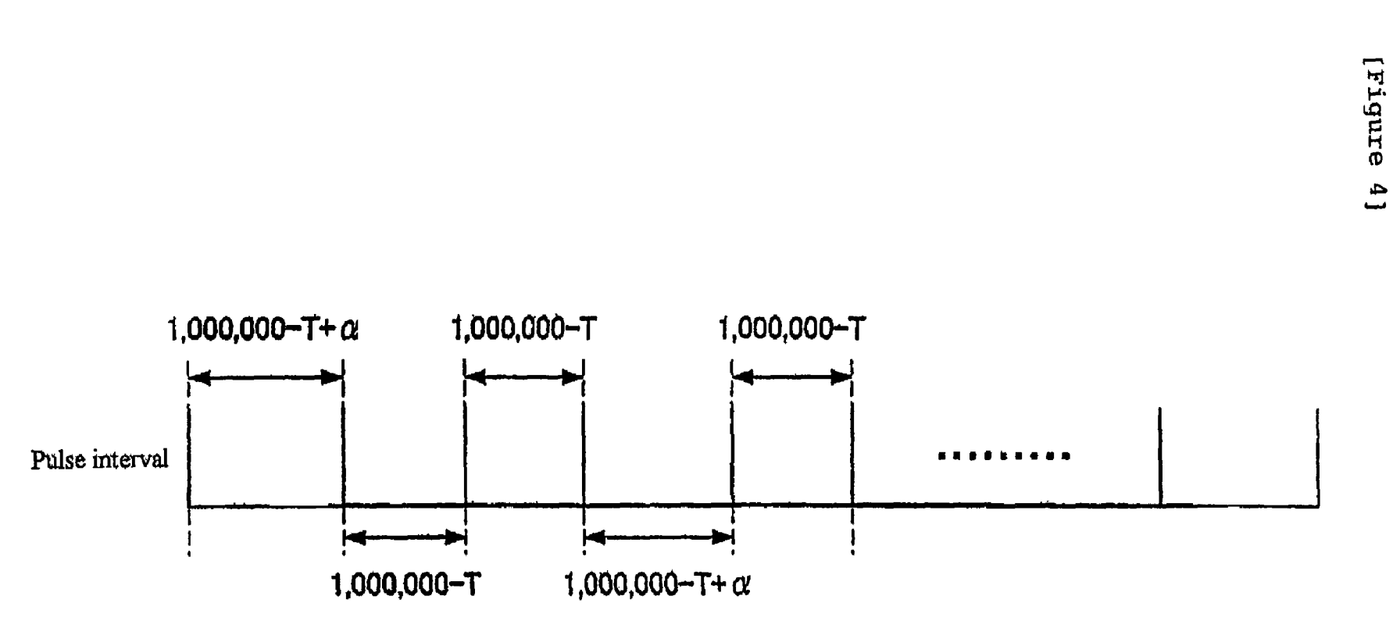
FIG. 4 is a chart for explaining a pulse interval for use in this embodiment.

Herein, suppose that the system clock 20 is delayed T [μsec] every second. If there is no influence of other processes or interrupt handlers, the pulse interval measured by the system clock 20 ought to be (1,000,000−T) [μsec]. Since in practice, there is any delay in detecting the pulse or acquiring the internal time due to influence of other processes or interrupt handlers, each pulse interval measured by the system clock 20 is not always equal to (1,000,000−T) [μsec], as shown in FIG. 4 (α is a delay time in FIG. 4.) However, if the pulse interval measured by the system clock 20 is close enough to (1,000,000−T) [μsec], it is judged that the pulse is detected without delay. Thus, specifically it is considered as a criterion for detecting the pulse without delay, to what degree each pulse interval measured by the system clock 20 should be close to (1,000,000−T) [μsec].

The value of T[μsec] indicating the delay of the system clock 20 varies from one system clock to another. Also, this value may be changed with the temperature of the CPU 10, depending on whether the operation is directly after starting the computer or in the stable operating state. Therefore, the value of T [μsec] cannot be set to an appropriate fixed value. Thus, in this embodiment, the value of T[μsec] for the system clock 20 may be individually judged by the statistical method.

More specifically, the 99% confidence interval is periodically computed from the average value and standard deviation of pulse intervals measured by the system clock 20, and if each pulse interval is included within this confidence interval, it is judged that there is no delay in detecting the pulse or acquiring the internal time at that time, in other words, the pulse interval does not contain any delay. And the time data received immediately after the detected pulse and the internal time acquired at the timing of detecting the pulse are compared, and a difference, if any, is considered as the delay T[μsec] of the system clock 20. Herein, the confidence interval is a statistical term, and means the interval indicating with a certain confidence that there is the population parameter in a certain interval. That is, the 99% confidence interval denotes the interval in which the true value is contained at a probability of 99% when the same examination is repeated. The computation of the 99% confidence interval is only one example, and the 95% confidence interval or other confidence intervals may be employed in accordance with the synchronization accuracy required for the system.

The number of samples used for computing the 99% confidence interval may be arbitrarily decided in accordance with the synchronization accuracy required for the system. However, to avoid a situation where it takes too long time to compute the standard deviation and the 99% confidence interval width, the number of pulses takes place from immediately after the time correction at the previous time to the time correction at the previous time with the limitation of a maximum of 128 pulses. A computational expression for the 99% confidence interval is given in the formula 1 as below.

[Formula 1]

$$\text{Average: } X = (X0 + X1 + \ldots Xn-1)/n$$

$$\text{Variance}(s^2), \text{ standard deviation}(s): s^2 = \{(X-X0)^2 + (X-X1)^2 + (X-X2)^2 + \ldots + (X-Xn-1)^2\}/n$$

$$\text{99\% cofidence interval: } X - 3*s/\sqrt{n} \leq X \leq X + 3*s/\sqrt{n}$$

In brief, the synchronization method for synchronizing the time of the system clock 20 according to this embodiment is made in the following way for synchronization between the reference clock 40 and the system clock 20.

First of all, a DCD pulse for time notice originated from the reference clock 40 is detected, and the internal time (detected time) that is the time of the system clock 20 at that timing is acquired. And the time data of the DCD pulse sent from the reference clock immediately after the DCD pulse and the detected time are compared, whereby it is judged whether or not there is an error to be corrected. On the other hand, the pulse interval that is a time difference between the detected time of the DCD pulse and the detected time of the previous DCD pulse is calculated, and it is judged whether or not the calculated value is contained in a certain confidence interval (e.g., 99% confidence interval) obtained by a statistical processing of sampling the pulse over the past intervals. That is, whether or not the correction is required is decided not only by comparing the time data of the DCD pulse and the detected time, but also by evaluating the pulse interval. And if the pulse interval is included within the confidence interval, the calculated pulse interval does not contain the delay, and is regarded as confidential to correct the time of the system clock 20 for the error between the time data of the DCD pulse and the detected time. Thereby, the system clock 20 is synchronized with the reference clock 40.

Figure 5:
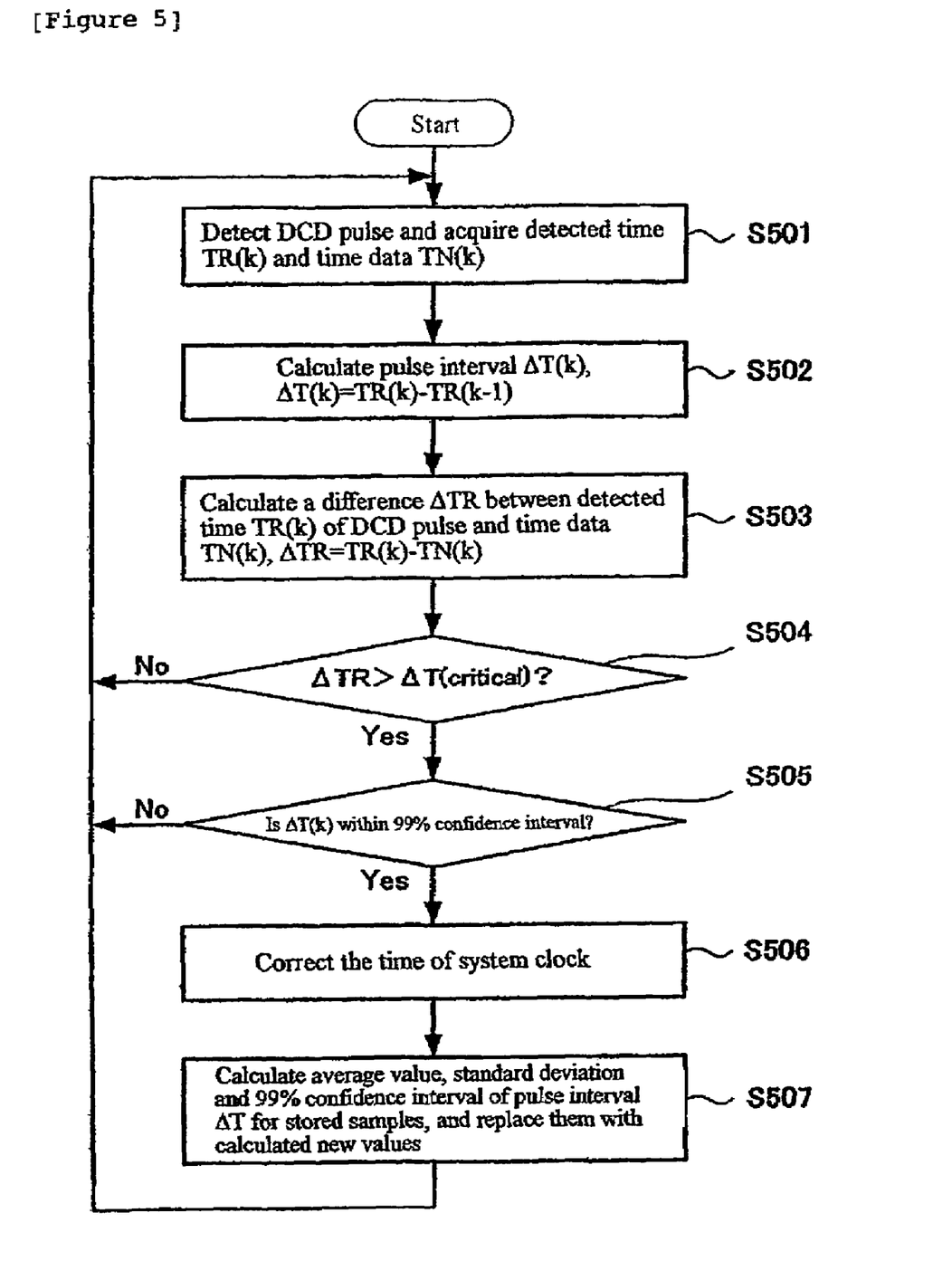
FIG. 5 is a flowchart showing an overall flow of a synchronization process of the system clock according to the embodiment.

Referring to a flowchart of FIG. 5, the overall flow of a synchronization process of the system clock 20 according to this embodiment will be described below.

The reference clock 40 originates a DCD pulse notifying the time every exact second, and the computer receives the DCD pulse via the serial port 30. And the time information inputting part 12 detects this DCD pulse, and acquires the time TR(k) of the system clock 20 at that time. Also, the time information inputting part 12 receives the time data TN (k) sent immediately after originating the DCD pulse from the reference clock 40 via the serial port 30. The acquired time information is held in means for storage such as main memory, not shown (step 501).

Then, the time correction controlling part 13 calculates the pulse interval ΔT(k) (=TR(k)−TR(k−1)) that is a difference between the detected time TR(k) of the DCD pulse acquired at step 501 and the previous detected time TR(k−1) of the DCD pulse. The calculated pulse interval is stored as a sample for statistical processing in means for storage such as main memory, not shown (step 502). Then, the time correction controlling part 13 calculates a difference ΔTR (=TR(k)−TN(k)) between the detected time TR(k) of the DCD pulse acquired at step 501 and the time data TN(k) from the reference clock 40 (step 503). And the absolute value of calculated value ΔTR and a preset critical value ΔT are compared (step 504). Herein, the critical value ΔT is the value indicating the set time as a criterion for judging whether or not to correct the time of the system clock 20. A specific value of the critical value ΔT may be arbitrarily set up in accordance with the synchronization accuracy required for the system, but in the system requiring the accuracy in a unit of 1 millisecond such as the contents distribution system of digital broadcasting, it may be about 800 microseconds.

Accordingly, if the calculated value ΔTR is within the critical value ΔT (No at step 504), the time of the system clock 20 is not corrected and the operation returns to step 501 to wait for the detection of the next DCD pulse.

On the other hand, if the calculated value ΔTR is beyond the critical value ΔT (Yes at step 504), the time correction controlling part 13 judges whether or not the pulse interval ΔT(k) calculated at step 502 is within the 99% confidence interval (step 505). The 99% confidence interval is calculated beforehand in the statistical processing of sampling the pulse over the past intervals at a step as will be described later, and stored in means for storage such as main memory, not shown. If the pulse interval ΔT(k) does not fall within the 99% confidence interval (No at step 505), it is considered that this pulse interval ΔT(k) contains a delay due to influence of the paging of memory or interrupt handlers, whereby the time of the system clock 20 is not corrected and the operation returns to step 501 to wait for the detection of the next DCD pulse.

On the contrary, if the pulse interval ΔT(k) falls within the 99% confidence interval (Yes at step 505), it is considered that the pulse interval ΔT(k) does not contain a delay due to influence of the paging of memory or interrupt handlers, whereby the time of the system clock 20 is corrected by ΔTR for an error (delay) between the detected time TR(k) of the DCD pulse and the time data TN(k) (step 506).

Since the time of the system clock 20 is corrected, the 99% confidence interval used for judgment at step 505 is updated (step 507). That is, the statistical processing part 14 calculates the average value, the standard deviation and the 99% confidence interval, employing the samples of pulse interval ΔT stored in predetermined means for storage at step 502, and replaces these parameters held in the means for storage such as main memory, not shown, with the newly calculated values. At the subsequent cycle, the time correction controlling part 13 makes the evaluation of step 505 for the pulse interval ΔT(k) of the acquired DCD pulse, employing the replaced parameters. The data used for calculation of the 99% confidence interval among the pulse intervals ΔT stored in the means for storage may be the data with the DCD pulse detected from immediately after the time correction at the previous time to the time correction at the previous time, as described above. An appropriate upper limit for the number of samples may be set in view of the processing efficiency. After correcting the time of the system clock 20 and updating the parameters for evaluating the pulse interval ΔT(k), the operation returns to step 501 to wait for the detection of the next DCD pulse. In the above way, in this embodiment, if there is an error between the time of the reference clock 40 and the time of the system clock 20, it is evaluated whether or not the time information is confidential, and then the time of the system clock 20 is corrected.

Also, in this embodiment, it is not individually judged whether or not there is any delay in detecting the DCD pulse or acquiring the internal time by designating the cause of the delay and the examination object, but it is evaluated whether or not there is any delay in the pulse interval as a result of the statistical processing. Therefore, it is possible to deal with the delay caused by various events occurring irregularly, other than the paging of memory and interrupt handlers cited as the cause of delay that cannot be removed in this embodiment.

In the above operation of this embodiment as described with reference to FIG. 5, when there is no delay in the pulse interval ΔT(k), and the detected time TR(k) of the DCD pulse and the time data TN(k) are confidential information, there is also the possibility that the delay occurs in the processing of time correction at step 506. For example, an instance where interrupt handlers of other devices is executed immediately before the time of the system clock 20 is set to the corrected value. However, if the time correction is performed in time, using a command for making the system clock 20 go faster or slower, rather than using a command for directly manipulating the time of the system clock 20, the delay at this stage is not problematical.

I claim:

1. A synchronization method for synchronizing an internal time of a system clock of a computer with an external reference clock, comprising:

detecting a signal for time notice sent from said reference clock and acquiring the internal time at the present time from said system clock by said computer;

calculating a signal interval that is a time difference in said system clock between two consecutive signals for time notice based on said acquired internal time by said computer;

evaluating said calculated signal interval and judging whether or not to correct said internal time by said computer; and correcting the time of said system clock when it is judged that said computer is required to correct said internal time, wherein the synchronization method is provided as a user process of an operating system of the computer, wherein judging whether or not to correct said internal time is based on whether said calculated signal interval falls within a certain confidence interval obtained by a statistical processing of sampling the signal over the past signal intervals by said computer.

2. The synchronization method according to claim 1, comprising a step of making the statistical processing using the signal interval calculated at the step of calculating said signal interval by said computer, and replacing the parameters for evaluation at the step of judging whether or not to correct said internal time.

3. The synchronization method according to claim 1, comprising a step of comparing the time information sent together with said signal for time notice from said reference clock and said internal time at the time of detecting said signal for time notice, and calculating a time difference between said time information and said internal time, wherein the step of correcting the time of said system clock comprises correcting for said calculated time difference.

4. A synchronization method for synchronizing an internal time of a system clock of a computer with an external reference clock, comprising:

detecting a signal for time notice sent from said reference clock and acquiring the internal time at the present time from said system clock by said computer;

calculating a signal interval that is a time difference in said system clock between two consecutive signals for time notice based on said acquired internal time by said computer;

evaluating said calculated signal interval and judging whether or not said signal interval contains a delay due to influence of a processing performed by said computer; and comparing the time information sent together with said signal for time notice from said reference clock and said internal time at the time of detecting said signal for time notice, and judging whether or not it is required to correct said internal time based on the comparison result by said computer; and correcting the time of said system clock when it is judged that said signal interval does not contain a delay due to influence of the processing performed by said computer and said computer is required to correct said internal time, wherein the synchronization method is provided as a user process of an operating system of the computer, wherein judging whether or not there is the delay comprises judging that said signal interval does not contain the delay due to influence of the processing performed by said computer when said calculated signal interval falls within a certain confidence interval obtained by a statistical processing of sampling the signal over the past signal intervals.

5. A computer system for performing processing synchronously with an internal system clock, comprising:

a time information inputting part for detecting a signal for time notice sent from an external reference clock and acquiring an internal time at the present time from said system clock inside the computer system;

a time correction controlling part for comparing the time information together with said signal for time notice from said reference clock and said internal time at the time of detecting said signal for time notice and correcting the time of said system clock based on the comparison result, wherein at least the time information inputting part and the time correction controlling part are each provided as a user process of an operating system of the computer system, said time correction controlling part calculates a signal interval that is a time difference in said system clock between two consecutive signals for time notice based on said internal time acquired from said time information inputting part, evaluating said calculated signal interval and judging whether or not it is required to correct said internal time, wherein said time correction controlling part corrects the time of said system clock when it is judged that said signal interval does not contain a delay due to influence of the processing performed by said computer in evaluating said signal interval, wherein said time correction controlling part judges that said signal interval does not contain a delay due to influence of the processing performed by said computer, when said calculated signal interval falls within a certain confidence interval obtained by a statistical processing of sampling the signal over the past signal intervals, and a statistical processing part for calculating parameters for evaluating said signal interval by performing a statistical processing of sampling the signal over the past signal intervals calculated in the past by said time correction controlling part, wherein said time correction controlling part judges whether or not said signal interval contains a delay due to influence of the processing performed by said computer, using the parameters calculated by said statistical processing part, the parameters including an updated average value, an updated standard deviation and an updated confidence interval.

6. A program for causing a computer to implement:

a first function of detecting a signal for time notice sent from an external reference clock and acquiring an internal time at the present time from a system clock inside a computer;

a second function of calculating a signal interval that is a time difference in said system clock between two consecutive signals for time notice based on said acquired internal time, evaluating said calculated signal interval and judging whether or not it is required to correct said internal time; and a third function of comparing the time information together with said signal for time notice from said reference clock and said internal time at the time of detecting said signal for time notice and correcting the time of said system clock based on the comparison result, wherein said first function, second function and third function are each provided as a user process of an operating system of the computer, wherein said second function comprises judging that said signal interval does not contain a delay due to influence of the processing performed by said computer, when said calculated signal interval falls within a certain confidence interval obtained by a statistical processing of sampling the signal over the past signal intervals.

7. The program according to claim 6, wherein said second function comprises judging that said computer is required to correct the time of said system clock when it is judged that said signal interval does not contain a delay due to influence of the processing performed by said computer in evaluating said signal interval.

8. The program according to claim 7, further comprising a fourth function of calculating the parameters for evaluating said signal interval by performing a statistical processing of sampling from the past signal intervals calculated in the past in said second function, wherein said the second function comprises judging whether or not said signal interval contains a delay due to influence of the processing performed by said computer, using the parameters calculated in said fourth function.

* * * * *